Aug. 30, 1932.                J. S. WATTS                1,874,395
                         SEWAGE SAMPLING DEVICE
                    Filed Aug. 13, 1929        2 Sheets-Sheet 1
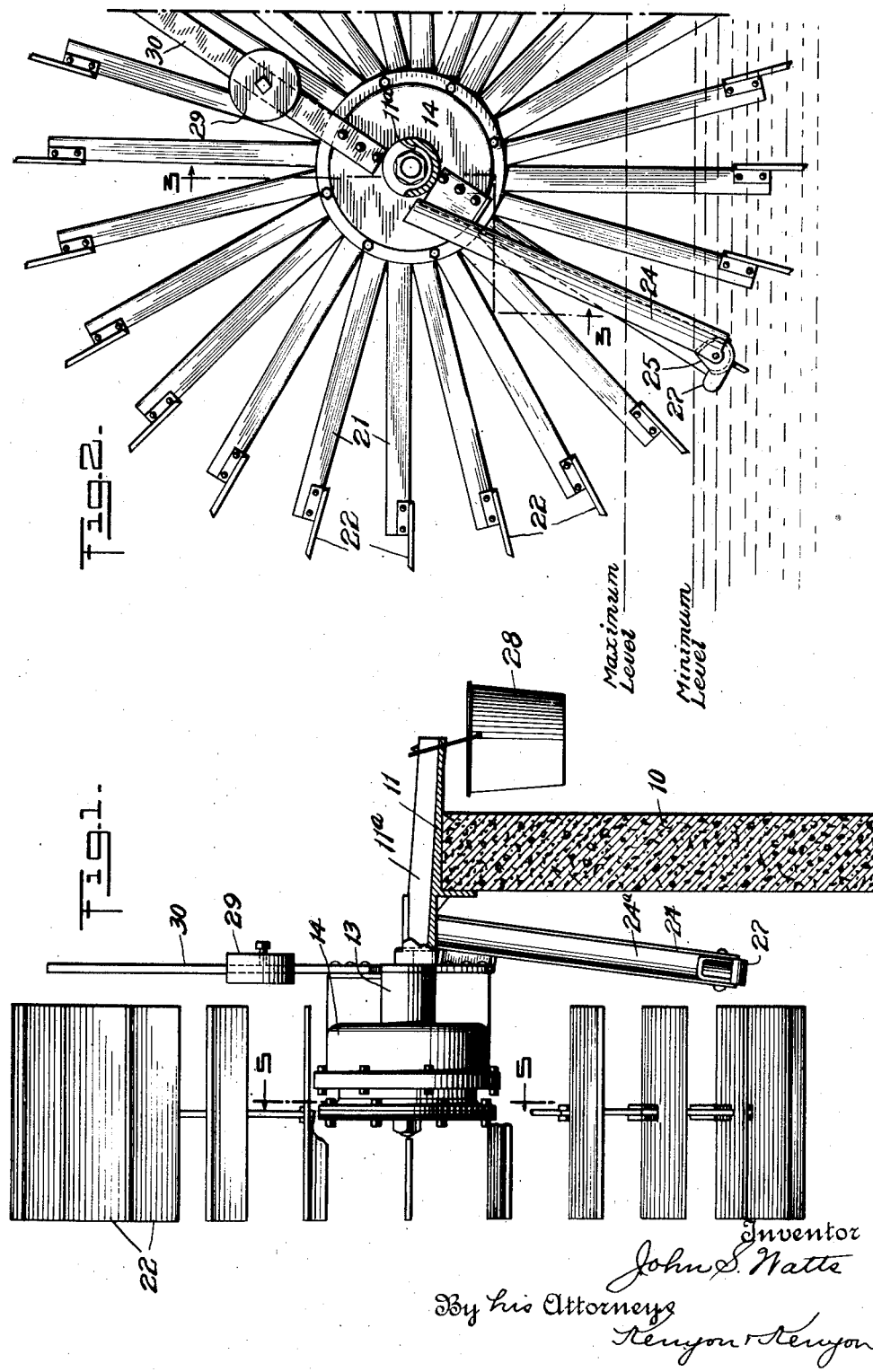

Aug. 30, 1932. J. S. WATTS 1,874,395
SEWAGE SAMPLING DEVICE
Filed Aug. 13, 1929 2 Sheets-Sheet 2
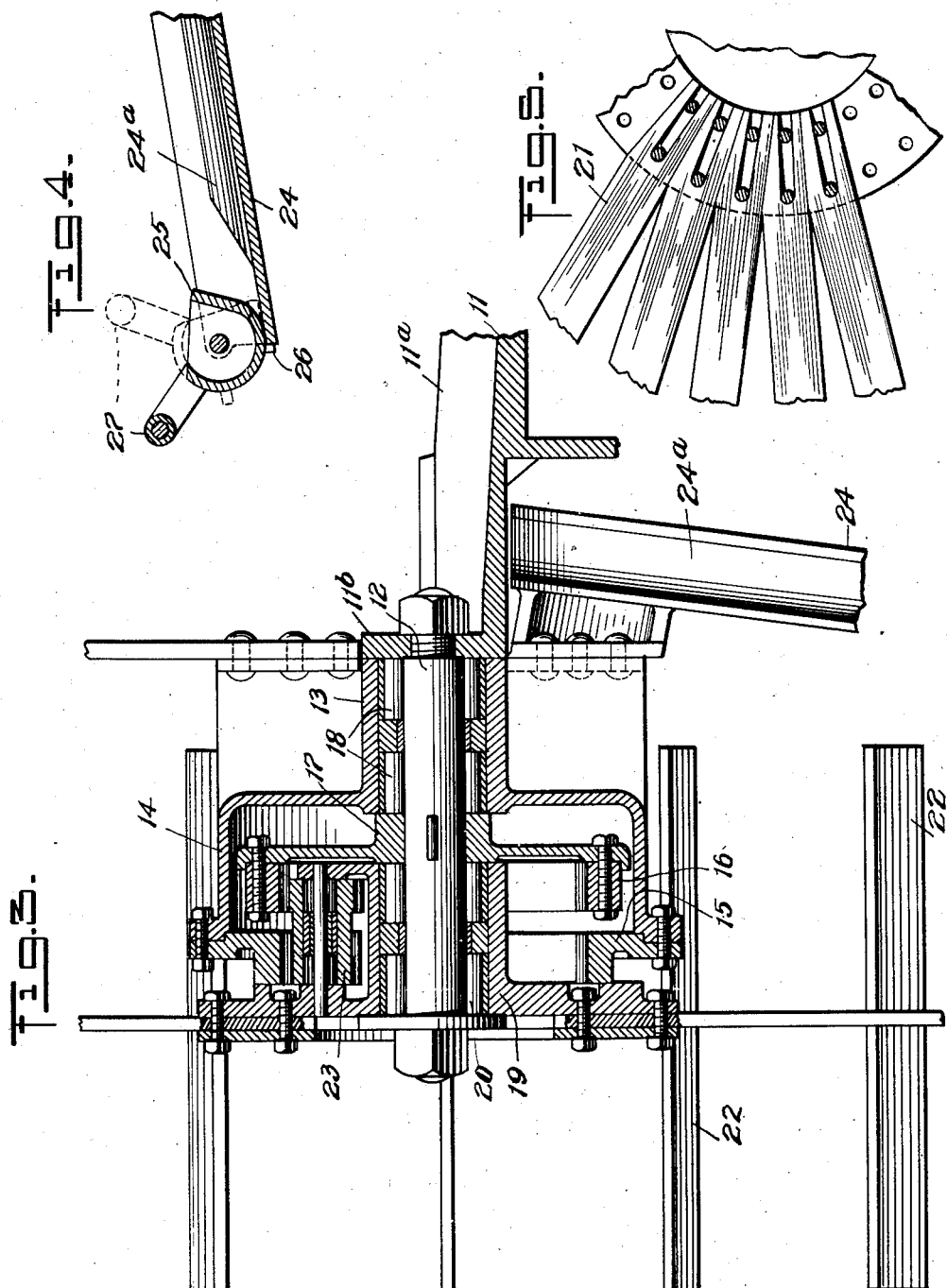

Patented Aug. 30, 1932

1,874,395

UNITED STATES PATENT OFFICE

JOHN S. WATTS, OF EAST ORANGE, NEW JERSEY

SEWAGE SAMPLING DEVICE

Application filed August 13, 1929. Serial No. 385,665.

This invention relates to devices for obtaining samples from a flowing stream of liquid and has for an object a device of this character in which the samples taken are proportional to the quantity of liquid flowing in the stream and in which clogging of the device by solids or the like contained in the liquid stream is reduced to a minimum.

An apparatus embodying this invention consists essentially of a scoop which is caused to dip periodically into the liquid stream and is so designed that the quantities of liquid taken from the stream vary proportionally with variations in the level of the stream. The scoop is driven by a paddle wheel or the like actuated by the stream so that the operating rate of the scoop is determined by the rate of flow of the stream. Thus, the quantity of liquid removed from the stream by the sampler over a period of time bears a definite ratio to the quantity of liquid flowing in the stream during such period.

Such a device is well adapted for obtaining samples of sewage for testing purposes.
By means of this device a large number of unit quantities of liquid may be removed from the stream over a definite period of time to obtain a supply of liquid representative of the average liquid in the stream. As the samples obtained bear a definite relation to the quantity of liquid flowing in the stream, the amounts of various materials in the sewage can be definitely determined. Conduits are provided for conveying the liquid from the scoop to a suitable receptacle and these conduits are in the nature of straight walled channels which afford no resting place for solids or gelatinous matter and thus reduce the clogging of the apparatus to a minimum.

Other objects, novel features and advantages of the invention will be apparent from the accompanying drawings, wherein:

Fig. 1 shows the device as an end view partly broken away.

Fig. 2 is a face view.

Fig. 3 is a section on the line 3—3 of Fig. 2.

Fig. 4 is a partial section through the scoop and its carrier, and Fig. 5 is a section on the line 5—5 of Fig. 1.

The sampling device is adapted to be supported on a wall 10 of a channel of a sewage disposal plant. A bed plate 11 is supported by the wall 10 and may be embedded or otherwise permanently attached thereto. The bed plate is provided with a trough 11a. A stationary shaft 12 is carried by the flange 11b of the plate 11 and has rotatably mounted thereon a hub 13 which terminates in a cylindrical housing 14. An interiorly toothed ring gear 15 is bolted to the rim of the housing 14 and a second interiorly toothed ring gear 16 is bolted to a plate 17 arranged within the housing 14 and keyed to the shaft 12. The hub 13 is mounted on the shaft 12 by means of roller bearings 18 and a second hub 19 is rotatably mounted on the shaft 12 by means of roller bearings 20. The hub 19 has attached thereto the inner ends of spokes 21, to the outer ends of which are attached the paddles 22. The hub 19 also carries a rotatable pinion 23 having two identical sets of teeth. One set of teeth meshes with the teeth of the ring gear 15 and the other set of teeth mesh with the teeth of the ring gear 16. The number of teeth in the ring gear 15 differs from the number of teeth in the ring gear 16 by one, thereby forming a reduction gearing. Thus, the hub 19 has to rotate several times to effect a single rotation of the hub 13.

An arm 24 is connected at one end to the hub 13 and at its other end it is provided with a scoop 25. This scoop is pivotally mounted and is provided with a lug 26 adapted to engage the end of the arm 24. The scoop also is provided with a weight 27, which under certain conditions tends to hold the scoop 25 with the lug 26 engaging the end of the arm 24. As the arm 24 rotates, the scoop is immersed in the stream of liquid and is partially or completely filled with liquid depending on the level of the stream. When the arm 24 reaches the position at which the weight 27 passes over the axis of the scoop, the weight is then effective to cause the latter quickly to rotate and discharge its contents. The arm 24 is provided with a channel 24a to receive the liquid discharge of the scoop and conduct the same to a channel 11a which in turn conducts the liquid to a receptacle 28. The liquid is thus caused to flow down the channel 24a with a rush so that there is substantially no chance for any clogging of the channel.

The scoop 25 is formed with its outer wall shorter than its inner wall so that over a limited range the quantity of liquid it picks up varies according to the level of the stream. The design of the scoop is such that the quantity of liquid picked up by the scoop is proportional to the height of the liquid above a predetermined minimum level. The amount of liquid collected in the receptacle 28 over a definite time is therefore directly proportional to the amount of liquid flowing past the sampler during that period of time. This is due to the fact that the unit quantities vary with the height of the liquid stream and the rate at which samples are taken varies with the speed of the stream inasmuch as the stream effects actuation of the paddle wheel.

A weight 29 is adjustably mounted on an arm 30 carried by the hub 13. This weight 29 counterbalances the weight of the arm 24 and scoop 25, thereby insuring uniform rotation of the paddle wheel.

By reason of the design of the scoop variations in the depth of the stream of the liquid will not affect the ratio of the removed liquid to the total volume in the stream. This is of considerable importance as the samples are collected over a considerable period of time, during which the amount of sewage flowing may vary considerably. Sewage plants usually have minimum and maximum levels between which the level of the stream may vary frequently during the collection period.

The channels 11a and 24a are formed with straight mouth walls which afford no resting place for solids and the like thus reducing the possibility of the formation of an obstruction in the channels. Also, there are no bends or corners and due to the fact that the liquid is discharged from the scoop into the channel 24a when the pitch of the latter is steep, the liquid rushes through the channels and carries along the solids, etc.

It is of course understood that various structural modifications may be made in the device above described, without in any way departing from the spirit of the invention as defined in the appended claims.

I claim:

1. A device for obtaining samples from a flowing stream of liquid which comprises a rotatable member, means to be actuated by said stream for effecting rotation of said member, an arm carried by said member, a scoop pivoted to the end of said arm, inter-engageable means on said scoop and arm to limit rotation of said scoop, and weight means for maintaining said inter-engageable means in engagement while the scoop is carried through a predetermined arc and rotating said scoop at the end of said arc.

2. A device for obtaining samples from a flowing stream of liquid which comprises a rotatable member, a paddle wheel, reduction gearing between said paddle wheel and rotatable member, an arm carried by said member and being provided with a channel, a scoop pivoted to the end of said arm and being arranged to discharge into said channel, inter-engageable means on said scoop and arm to limit rotation of said scoop, and weight means tending to maintain said inter-engageable means in engagement while said scoop is carried through a predetermined arc and being effective to rotate said scoop at the end of said arc.

3. A device for obtaining samples from a flowing stream which comprises a rotatable member, means to be actuated by said stream for effecting rotation of said member, an arm carried by said member and being provided with a channel, a scoop pivoted to the end of said arm and being arranged to discharge into said channel, inter-engageable means on said scoop and arm to limit rotation of said scoop, and weight means tending to maintain said inter-engageable means in engagement while said scoop is carried through a predetermined arc and being effective to rotate said scoop at the end of said arc.

4. A device for obtaining samples from a flowing stream which comprises a rotatable member, means to be actuated by said stream for effecting rotation of said member, an arm carried by said member and being provided with a straight wall channel, a second straight wall channel substantially coaxial with the axis of rotation of said rotatable member and being adapted to receive liquid from said first channel when the same is in a predetermined position, a scoop pivoted to the end of said arm, and being arranged to discharge into said first channel inter-engageable means on said scoop and arm to limit rotation of said scoop, and weight means tending to maintain said inter-engageable means in engagement while said scoop is carried through a predetermined arc and being effective to rotate said scoop at the end of said arc.

In testimony whereof, I have signed my name to this specification.

JOHN S. WATTS.